United States Patent [19]
Dodd

[11] 4,255,261
[45] Mar. 10, 1981

[54] SEPARATION DRUM FOR BELT FILTER WITH SUCTION RECOVERY OF SOLIDS

[76] Inventor: Joseph C. Dodd, 2 Meng Suan Rd., Singapore 26, Singapore

[21] Appl. No.: 29,266

[22] Filed: Apr. 11, 1979

[51] Int. Cl.³ .............................................. B01D 37/02
[52] U.S. Cl. ................................... 210/193; 210/386; 210/396; 210/401
[58] Field of Search ............... 210/390, 395, 398, 399, 210/410, 401, 404, 405, 406, 416, DIG. 18, 193; 162/357; 209/250, 288

[56] References Cited

U.S. PATENT DOCUMENTS

| | | | |
|---|---|---|---|
| 1,870,485 | 8/1932 | Becrafe | 210/395 |
| 2,480,716 | 8/1949 | Derfler | 209/288 |
| 3,661,262 | 5/1972 | Sanders | 210/169 |
| 3,951,805 | 4/1976 | Dodd | 210/410 |
| 4,137,159 | 1/1979 | Sawyer | 210/DIG. 18 |

*Primary Examiner*—Theodore A. Granger
*Attorney, Agent, or Firm*—Lothrop & West

[57] ABSTRACT

A separation drum for suction recovery at high concentration of fine particles, such as algae, removed from dilute liquid medium by a belt filter has a thin, perforated wall rotatably mounted on a substantially horizontal, cantilevered beam fixed on a base. A pair of rings or hubs engage the separation drum at opposite ends. One ring is rotatably supported on rollers mounted on the beam, and the other ring is rotatably supported on a bearing mounted on a shaft extending from the beam to a removable end pedestal on the base. A number of interior rollers, also supported from the beam, engage the interior surface of the drum. A conduction or suction box is disposed on the beam or built into the beam in juxtaposition with the upper, interior portion of the separation drum to receive and carry away material passing through the perforated drum wall. A main belt extends around the exterior of the separation drum wall and around a filtration drum within a liquid medium containing algae. Various adjuncts, such as coating devices, secondary belts, sprays, cleaning devices and the like, are arranged to work in conjunction with the main belt and drum. The main belt may be constructed of a coarseweave fabric on which is deposited a layer of precoat material such as paper pulp, or of fine-weave fabric or other perforate material, capable of trapping the suspended algae from the liquid medium as it passes through the main belt on the filtration drum.

8 Claims, 6 Drawing Figures

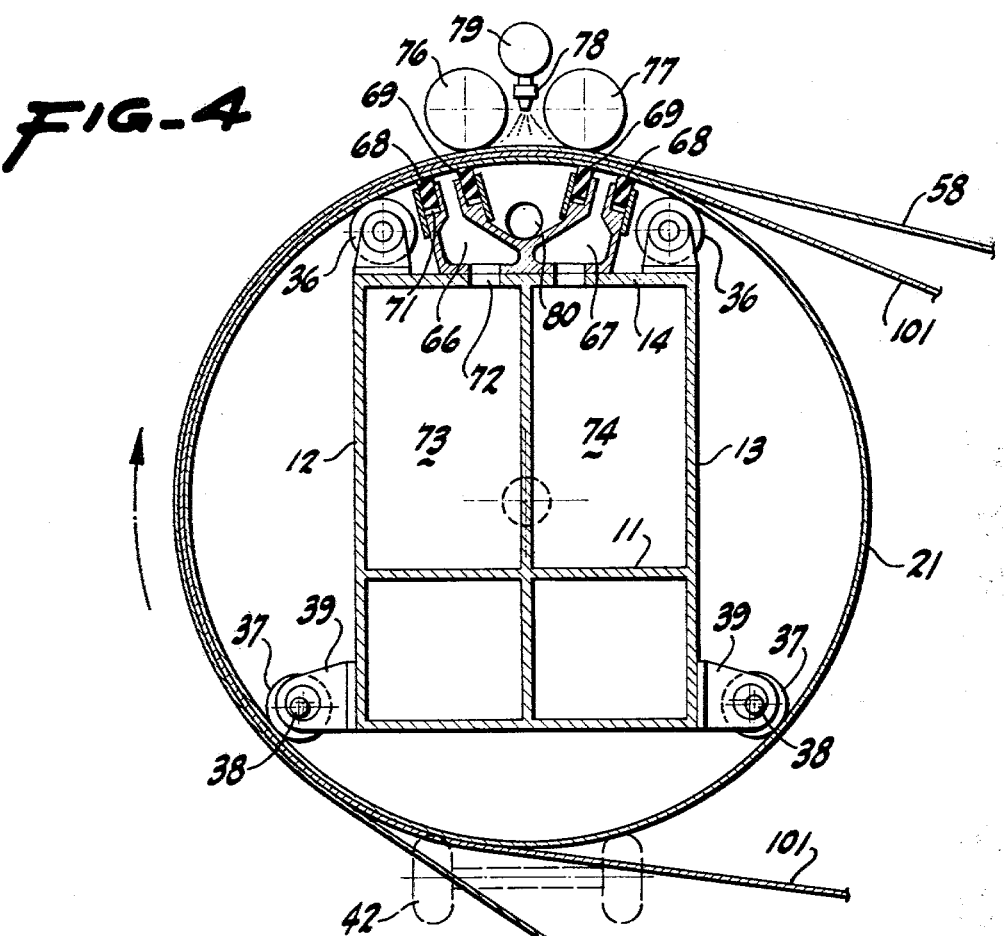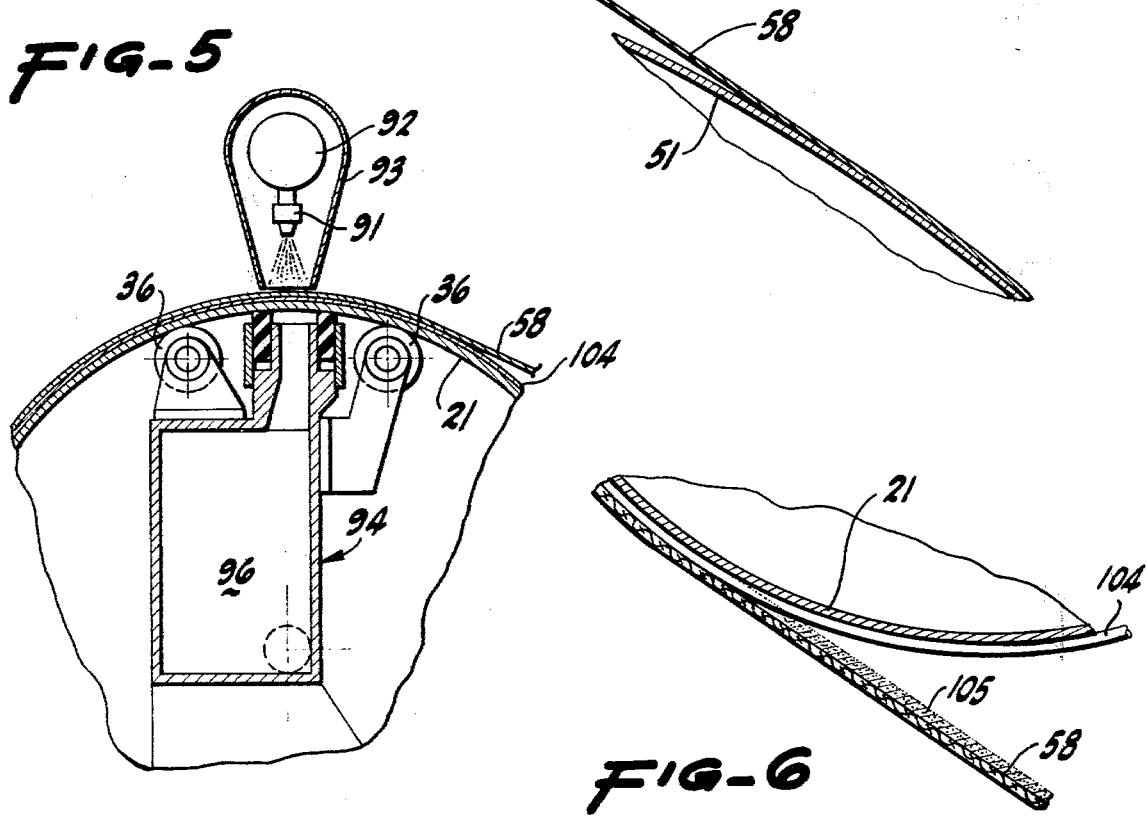

SEPARATION DRUM FOR BELT FILTER WITH SUCTION RECOVERY OF SOLIDS

CROSS-REFERENCES TO RELATED APPLICATIONS

None.

BRIEF SUMMARY OF THE INVENTION

In order to provide easy, troublefree extraction of fine particulate material (of which algae will be used as an example) from a dilute liquid medium containing the algae, and resulting in a high concentration of the recovered solids, there is provided on a horizontal cantilever beam a perforated, thin-walled separation drum rotatably mounted on the beam and removable therefrom endwise from time to time for replacement or repair. The thin drum wall is preferably a sheet of stainless steel perforated according to a pattern providing a large area of opening of relatively short radial depth to preclude clogging. This also allows use of punched rather than drilled holes in the drum wall. The drum is utilized in engagement with a main belt, constructed of coarse-weave fabric with precoat material such as paper pulp, or fine-weave fabric or other perforate material capable of trapping the algae, which extends into a body containing algae and preferably also with a secondary belt or drum wrapping (fine-weave main belt option) interposed between the separation drum and the main belt. There is a suction box or several suction boxes disposed on the beam within the drum in contact with the separation drum wall thereof, and there are spray devices, coating and cleaning devices and various other adjuncts to assist in the operation of the belt filter.

BRIEF DESCRIPTION OF THE SEVERAL VIEWS OF THE DRAWINGS

FIG. 4 is an enlarged cross-section in a plane perpendicular to the axis of the separation drum especially shown in FIG. 2, the plane of section being indicated by the line 4—4 of FIG. 2.

FIG. 5 is an enlarged detail similar to FIG. 4 but showing a modified form of construction.

FIG. 6 is a fragmentary view of a portion of the thin-wall separation drum to an enlarged scale and showing the main belt and drum wrapping in connection therewith.

DETAILED DESCRIPTION

Figure 1:
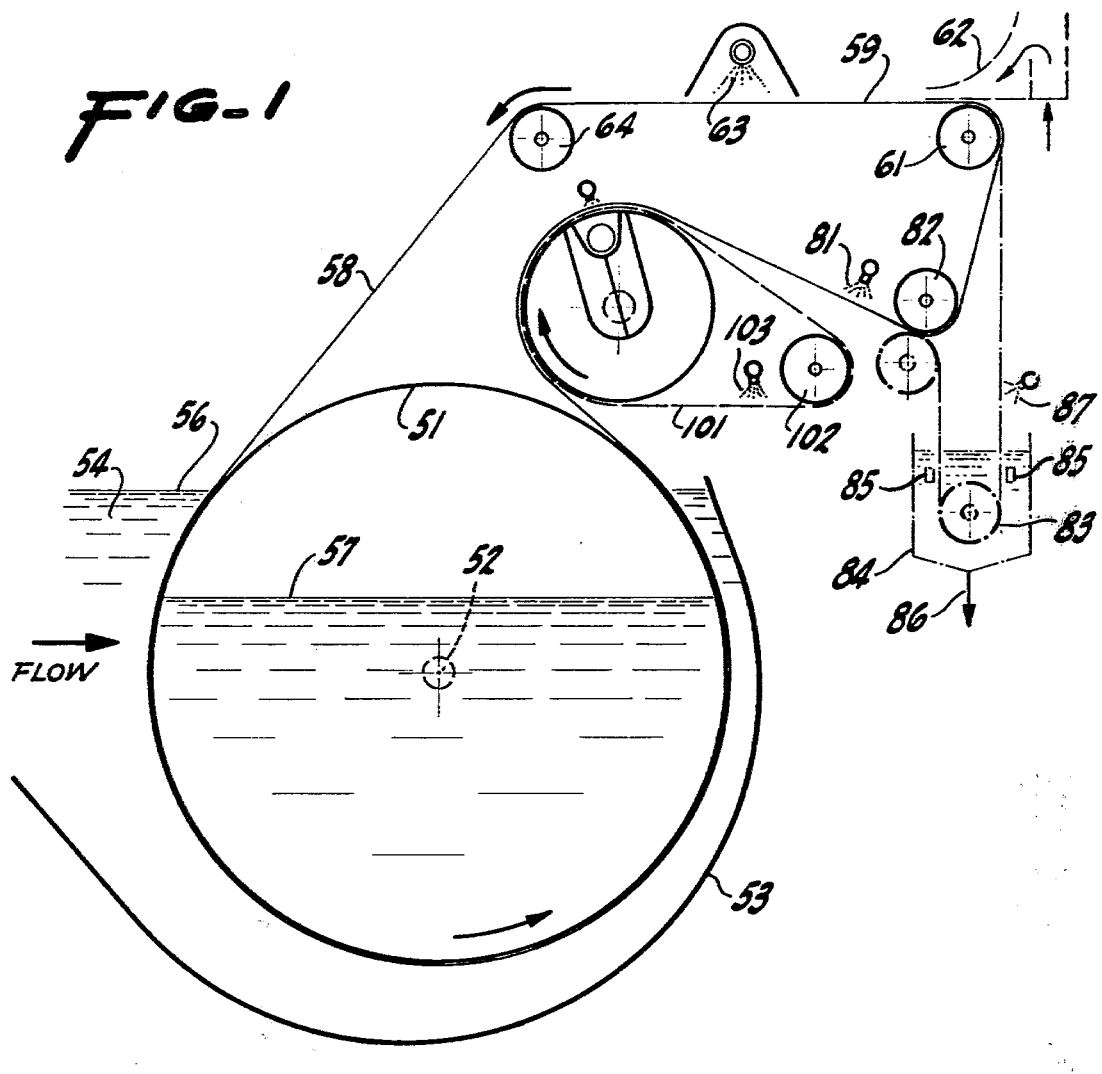
FIG. 1 is a diagrammatic view in cross-section on a plane normal to the axis of rotation of the separation drum and showing various of the adjuncts utilized therewith in diagrammatic form also.

Pursuant to the invention, there is preferably provided on an appropriate supporting base 6 a sturdy pedestal 7 connected to and supporting a cantilever beam 8 of generally hollow construction and extending along an axis 9. The beam includes an appropriate bottom wall 11, a pair of side walls 12 and 13 and a top wall 14 to provide a substantially closed support, which also serves as a flow passage for suction air and removed water and solids from the belt.

Adjacent the pedestal end of the beam and adjacent the top wall 14 thereof are one or more rollers 17 in supporting engagement with a drive sprocket 18 associated with an end ring 19 circumscribing the beam 8. Alternatively, the drum may be driven from the opposite end only, and rollers 17 may bear directly on the ring 19. The ring 19 is in engagement with one end of a thin-walled, perforated, cylindrical drum 21 circular in cross-section and centered on the axis 9, the drum extending for substantially the entire length of the beam 8.

To support the drum at its other end, there is provided a similar sprocket 22 associated with and joined to a second ring 23. Both rings 19 and 23 are connected to the adjacent end of the drum by roll pins 24 extending radially through some of the edge perforations in the drum and into the rings. The sprocket 22 has a hub 26 engaging a bearing 27 mounted on a stub shaft 28 fixed in the outboard end of the beam 8. The shaft 28 also extends into a boss 31 at the upper end of a pedestal 32 removably secured to the base 6 by fasteners 33.

Since the drum 21 is quite thin and extends for a substantial axial distance, it is intermediately supported at axially and circumferentially spaced intervals along and around the beam by rollers 36 mounted on the top wall 14 of the beam, as shown in FIG. 4. The drum is also supported and positioned by rollers 37 secured around eccentric bushings 38 carried in brackets 39 secured to the side walls 12 and 13 of the beam. By this means, the whole drum is maintained substantially in a circular-cylindrical configuration, and the rollers are maintained in close abutment with the interior of the drum wall since the rollers 37 can be adjusted by the eccentrics 38. The rollers are displaced from one another axially sufficient to contact the drum wall at different points, to reduce wear on the drum wall at any single point. This manner of support is utilized because the drum itself is preferably of a stainless steel sheet approximately three-sixteenths of an inch in radial thickness and is perforated by circular holes about one-quarter inch in diameter, themselves spaced in staggered arrays and being about three-eighths of an inch apart. The thin-wall construction allows fabrication by punching rather than drilling the holes, and reduces friction loss and danger of clogging with recovered solids. This wall is relatively flexible and so the indicated internal support is provided in the case of larger machines. For smaller machines, one or more of the intermediate support rollers may be omitted.

Figure 2:
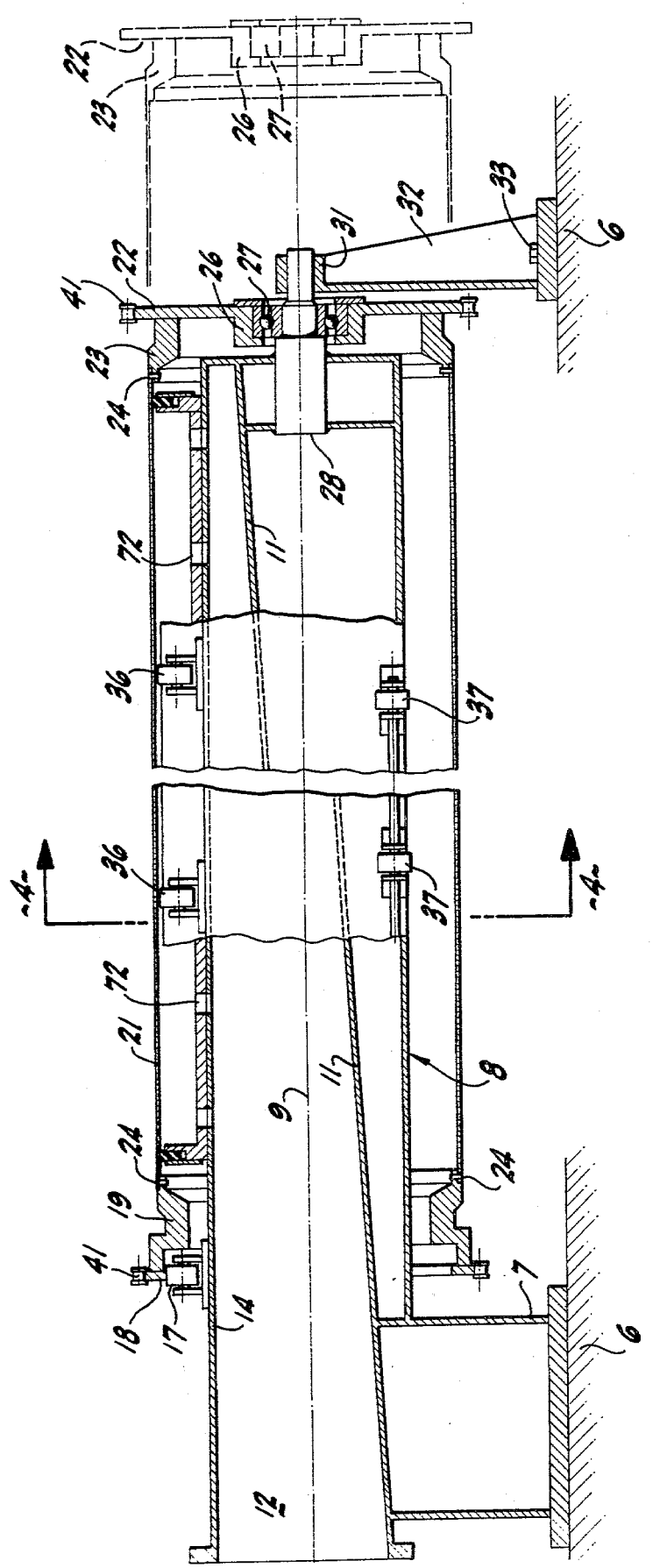
FIG. 2 is a cross-section on a longitudinal axial plane through a cantilever beam support and a surrounding thin-wall separation drum, portions being broken away.

The drum is preferably rotated, when in the assembled condition as shown in FIG. 2, by chains 41 engaging the sprockets 18 and 22 and appropriately driven by power-operated auxiliary sprockets, not shown. With this arrangement, in order to remove the drum from its support, it is merely necessary to remove the power connections, remove the fasteners 33 from the pedestal 32 and remove the pedestal itself, leaving the stationary stub shaft 28 supported in the end of the beam, but withdrawing the sprocket 22 and the bearing 27 and likewise removing the ring 23 after withdrawing the roll pins 24 that connect the ring with the drum wall. When the roll pins 24 have also been removed from the other end, the drum wall can be withdrawn axially by itself, preferably after relaxation of the adjustment of the rollers 37. The drum can be supported temporarily on a dolly 42 (FIG. 4). A new drum can be installed in a reverse order, or the removed drum can be cleaned or repaired and similarly reinstalled.

As an alternative, after removal of the pedestal 32 and of the chains 41, only the roll pins 24 at the left end (in FIG. 2) of the drum need be removed, and then the subassembly of the end ring 23, the sprocket 22 and the bearing 27 can be removed, as illustrated in FIG. 2 by the dotted lines. Restoration of those parts can be accomplished in reverse order.

With an available drum having a thin wall, as described, the associated mechanism for recovering algae at high concentration from a dilute liquid medium preferably includes a filtration drum 51 (FIG. 1) arranged to revolve about a shaft 52 in a vat 53 containing a liquid medium 54 in which the algae to be recovered are contained. Because of a pressure difference between the inside and the outside of the filtration drum 51, the level 56 of the exterior liquid is substantially higher than the level 57 of the interior liquid.

Figure 3:
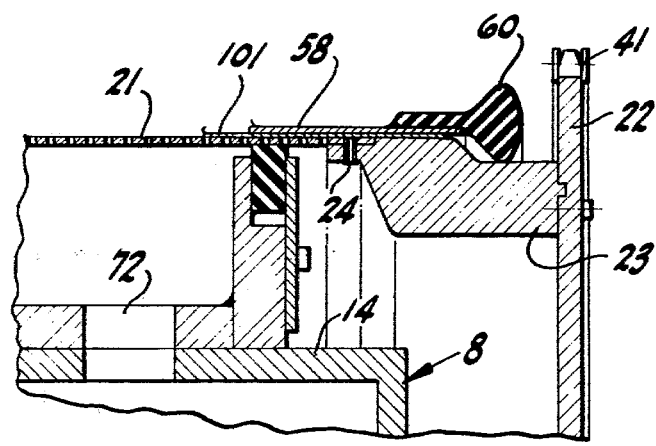
FIG. 3 is a cross-section to an enlarged scale of one portion of the separation drum with the main and secondary belts or drum wrapping in connection therewith, various portions being broken away to reduce the size of the figure.

Trained around the filtration drum is a main belt 58, which may be guided onto the drum by edge enlargements 60 (FIG. 3) engaging pairs of inclined rollers (not shown) which hold the belt edges in alignment. The main belt enters the vat at about the level 56 in contact with the drum and leaves the drum similarly on the other side thereof after having passed around about two hundred seventy degrees of the filtration drum circumference.

In many instances, to assist filtration it is desired to provide the main belt 58 with a covering or coating before such belt is introduced into the vat 53. For that reason and under those conditions, the belt 58 has a substantially horizontal reach 59, as shown in FIG. 1, extending from a guide drum 61 disposed substantially at the outlet of a paper-forming head box 62. This deposits a coating of paper slurry or pulp of the desired thickness on the reach 59. The so-coated belt then travels around another guide drum or roller 64 and then travels to the filtration drum 51. Alternatively, the main belt may be constructed of a fine-weave fabric or other perforate material, such as a polyester fabric having clear openings (aperture rating) between 3 and 30 micrometers, capable of directly trapping the algae as the liquid medium passes through the belt on the filtration drum.

Algae are deposited on the main belt 58 as it travels submerged in the vat. The charged belt then emerges from the vat and is trained around the outside of the separation drum 21, as shown in FIG. 4, travelling in a clockwise direction around the drum. The main belt 58, near the top of the drum, passes over a primary or first stage conduction or suction box 66 and then over a similar secondary or second stage conduction or suction box 67. The primary suction box 66 is of channel form extending for much of the length of the beam 8 on the upper portion thereof and is subjected to subatmospheric pressure.

Algae on the main belt are pulled through the secondary belt or drum wrapping and separation drum wall into the first stage suction box 66. Leakage is precluded by a pair of sealing strips 68 and 69 urged radially outwardly against the interior of the screen drum by air pressure within chambers 71 beneath the ends of the sealing strips.

The algae with accompanying liquid in the first stage suction box flow through apertures 72 in the base thereof into a suction passage 73 formed within and serving as part of the support beam 8. The beam connects to subsequent handling equipment, not shown. The separated solids and accompanying liquid flow to the discharge or left end thereof, as seen in FIG. 2, for further handling. Similarly, the secondary suction box 67 is provided with comparable sealing strips and apertures and discharges into a secondary suction passage 74 also forming part of the beam 8 and leading downwardly and away therefrom for further handling.

In order to improve separation of the materials from the main belt and to assist in the operation of the secondary suction mechanism, the outside of the main belt 58 rides under a pair of rollers 76 and 77 (FIG. 4) disposed on opposite sides of a series of spray nozzles 78 supplied through a pipe 79 with water spray just sufficient to resaturate the belt. The drainage is into a channel 80 and pipe. By this means, substantially all of the algae within or on the main belt are removed through the suction boxes. The spray nozzles and rollers may also be shifted laterally to impinge on the main belt over either of the suction boxes or points in between during operation or for cleanup after machine shutdown.

The main belt then continues on, preferably under a shower 81 (FIG. 1), and finally around a roller 82 and returns to travel again around the roller 61, for recoating if required, and repetition of the cycle.

As an alternative, the main belt may, particularly for the fine-weave main belt option, instead of going directly between the rollers 82 and 61, be diverted around a roller 83 (FIG. 1) in a dip vat 84. The dip vat may contain cleaning chemicals such as hypochlorite solution, dilute acid, or cleaning devices such as ultrasonic transducers 85 for continuous or periodic cleaning of the main belt. Cleaning chemicals may also be applied via sprays 81 or 87. Since some solids will eventually deposit in the dip vat 84, there is a drain 86 therefrom so that such solids can readily be removed. Also, the main belt in emerging from the dip vat passes a spray 87 so that it can then recycle in appropriate, virtually clean condition. An ultraviolet lamp 63 may also be used to prevent or inhibit slime growth on the fine-weave main belt.

Under some circumstances, it may be unnecessary or uneconomic to use two-stage suction boxes 66 and 67. Under these conditions, as shown in FIG. 5, the main belt 58 passes over a single stage suction box 94. An air or fine water spray may also be applied to improve separation or for cleanup, through a movable or shiftable spray 91 supplied through a conduit 92 above the separation drum and housed in a partial or continuous jacket 93, so that the spray extends over nearly the full width of the main belt above the suction box. Material from the main belt and inclusive of the spray and dislodged algae is drawn into a single stage suction box 94 leading into a single conduit 96 in the beam 8, which otherwise is substantially as previously illustrated. The beam conduit drains into later handling equipment, not shown.

Under many conditions, the main belt is substantially supplemented by a secondary belt 101 trained around an idle roller 102 (FIG. 1) and then extending around the separation drum 21 in close contact therewith and just beneath the main belt 58. The support strength of the separation drum is sufficient to sustain the pressures thereon by the secondary belt 101, as well as by the main belt 58, in spite of the thinwall construction due to the action of the intermediate support rollers 36 and 37. This arrangement often provides a better extraction of the algae and transfer thereof to the next stages in the recovery process. Under these circumstances, the secondary belt is maintained clean by a spray 103 washing the belt 101 from the inside outwardly just before that belt is interposed between the main belt and the screen drum.

Alternatively, in the case of the fine-weave main belt option, a drum wrapping 104 such as a fine stainless steel wire wrapping around the separation drum at about one-eighth inch pitch, closing to a tight wrapping at the drum ends for sealing purposes, may be used. The cake of algae 105 on the main belt is drawn through the wire wrapping into the drum wall perforations, the wire causing a space for free movement of algae into the perforations over virtually the full belt area.

I claim:

1. A belt filter with suction recovery of the solids trapped on the belt by means of a separation drum assembly comprising a base; a substantially horizontal cantilever beam mounted on said base, said beam being substantially hollow and open at one end; a horizontal separation drum having a relatively thin, perforate wall encompassing said beam and extending for substantially the entire length thereof; means for at least partly supporting said separation drum on said beam for rotation around said beam and for endwise withdrawal therefrom; means including a conduction box with said beam and in substantial contact with the inside of said separation drum and defining passages on and in said beam leading from the perforate beam wall to the interior of said beam; and means defining a discharge opening at said one end of said beam communicating with said passages.

2. A device as in claim 1 including supplemental means for supporting the cantilevered end of said beam on said base, said supplemental means being removable out of the path of endwise withdrawal of said drum from said cantilever beam.

3. A device as in claim 1 including rings at the opposite ends of said separation drum and at least in part rotatable on and relative to said beam.

4. A device as in claim 1 in which said wall is disposed around said rings and is connected thereto at each end by a plurality of radial pins.

5. A device as in claim 1 including a number of rollers supported on said beam and engaging the inner surface of said separation drum wall.

6. A device as in claim 5 in which said rollers are spaced apart axially of said separation drum wall.

7. A device as in claim 1 including a main belt and means for training said main belt to extend around and travel with the exterior of said separation drum wall and a wire wrapping around the exterior of said separation drum wall.

8. A device as in claim 1 in which said conduction box is disposed near the top of said drum and is sealed against the interior of said drum wall by a strip seal urged into sealing contact by pressure in a cavity below said seal and a sprayer is disposed outside said drum above and directed toward said conduction box.

* * * * *